Oct. 6, 1959

B. F. BURNER

2,907,231

HYDRAULIC POWER TRANSMITTING MECHANISM

Filed Aug. 6, 1956

Inventor
Bingham F. Burner

By Shoemaker & Mattare
Attorneys

Oct. 6, 1959  B. F. BURNER  2,907,231
HYDRAULIC POWER TRANSMITTING MECHANISM
Filed Aug. 6, 1956  9 Sheets-Sheet 2

Inventor
Bingham F. Burner

By Shoemaker & Mattare
Attorneys

Oct. 6, 1959    B. F. BURNER    2,907,231
HYDRAULIC POWER TRANSMITTING MECHANISM
Filed Aug. 6, 1956    9 Sheets-Sheet 3

Inventor
Bingham F. Burner
By Shoemaker & Mattare
Attorneys

Oct. 6, 1959    B. F. BURNER    2,907,231
HYDRAULIC POWER TRANSMITTING MECHANISM
Filed Aug. 6, 1956    9 Sheets-Sheet 5

Inventor
Bingham F. Burner
By Shoemaker & Mattare
Attorneys

Oct. 6, 1959  B. F. BURNER  2,907,231
HYDRAULIC POWER TRANSMITTING MECHANISM
Filed Aug. 6, 1956  9 Sheets-Sheet 6

Inventor
Bingham F. Burner
by
Shoemaker & Mattare
Attorneys

Oct. 6, 1959 — B. F. BURNER — 2,907,231
HYDRAULIC POWER TRANSMITTING MECHANISM
Filed Aug. 6, 1956 — 9 Sheets-Sheet 7

Inventor
Bingham F. Burner

By Shoemaker & Mattare
Attorneys

Oct. 6, 1959 B. F. BURNER 2,907,231
HYDRAULIC POWER TRANSMITTING MECHANISM
Filed Aug. 6, 1956 9 Sheets-Sheet 9

Inventor
Bingham F. Burner
By Shoemaker & Mattare
Attorneys

United States Patent Office 2,907,231
Patented Oct. 6, 1959

2,907,231

HYDRAULIC POWER TRANSMITTING MECHANISM

Bingham F. Burner, Arlington, Va.

Application August 6, 1956, Serial No. 602,288

23 Claims. (Cl. 74—701)

This invention relates to improvements in hydraulic power transmitting mechanism, and particularly to one designed to function as a clutch, wherein positive ratios of torque to the difference in speed of the drive and driven members may be established at will through an infinite range between a free relation wherein the driven member is stationary and the torque is zero to a relation wherein the drive and driven members are positively locked together and the full torque of the drive is applied to the driven member. It is also a highly important aim of the invention to regulate the effective clutching force of the device so that it is proportionate to the ratio of available power in the driving member and the load or inertia opposing the operation of the driven member. In consequence, liability of strain of drive shaft, axles, and gears, or stripping of the latter, is safeguarded against. That is to say, it is my purpose to enable the adjustment of my clutch to any prime mover power, so that if the total available power or a predetermined part is applied without effecting movement of the driven member at a rate above the required speed, the clutch will not lock, but will free the driving member sufficiently to enable its continued operation.

In my invention also, it is a purpose to obtain effective transmission of available power with variation of the ratio from free uncoupled movement of the driver to full direct drive, regardless of the speeds of the drive and driven members. At the same time it is the aim to attain all the advantages of gradual starting of the driven member without "bucking," "grabbing" or shock, due to irregularities of torque transmitted or produced such irregularities, which are accompaniments of the functions of some clutch devices.

It is also an object of the present invention to provide a fluid drive mechanism functioning as a clutch, wherein sudden overloads applied to a driven part will bring about release of the coupling between driving and driven parts to avoid damage to driven mechanism or stalling of the power plant.

The foregoing statements are of importance in automobile and other vehicular transmissions in avoiding waste of fuel, in racing an engine, in order to obtain the desired torque benefits, as well as minimizing wear and damage to mechanisms.

At the same time that the above benefits are attained it is also an aim of the invention to afford a radical reduction in size and complexity of the mechanism for a given load capacity so that the device may be economically produced and easily installed in conventional motor vehicles within the space limitations and conventional pedal control requirements.

The invention will be best understood from a consideration of the following detailed description taken in connection with the accompanying drawings forming a part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Figure 18 is a horizontal section through and near the top of the transmission case of a multi-ratio, reversible gear transmission utilizing the invention, with parts broken away to show interior structure.

Figure 14:
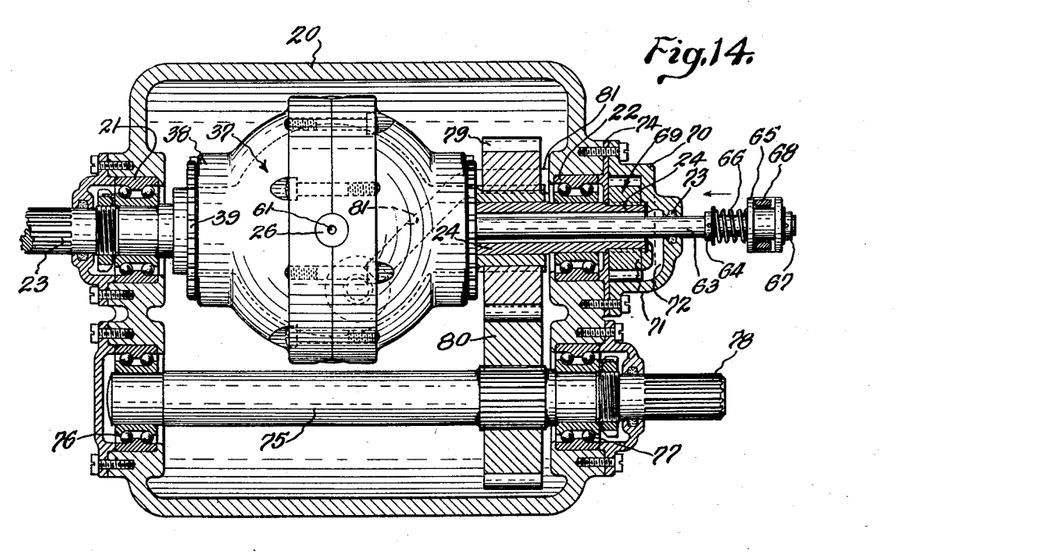
Figure 14 is a horizontal section of a transmission providing a gear pump to supply oil to the clutch.

Referring more particularly to the drawings, there is illustrated in Figure 14, a transmission case 20, providing a convenient mounting for the clutch, though various other mountings may be employed and the invention is applicable to various other forms of power transmitting uses as will hereinafter appear.

Figure 5:
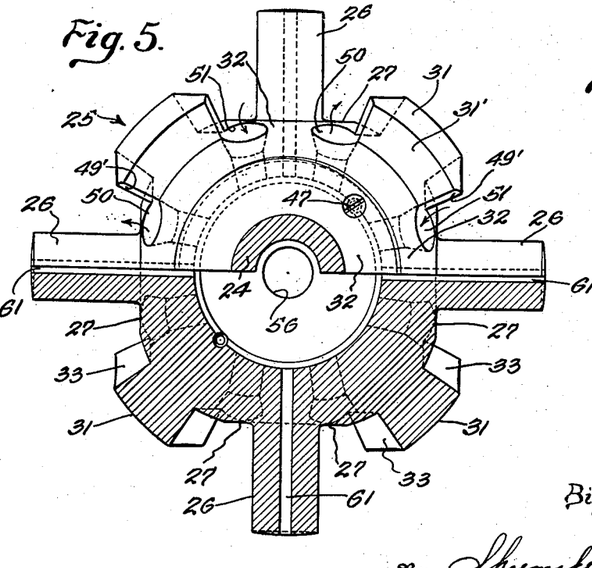
Figure 5 is a vertical section taken substantially on the line 5—5 of Figure 2.
Figure 6:
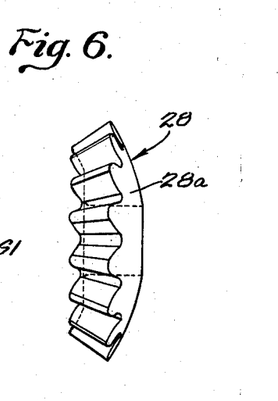
Figure 6 is an edge view of one of the planetary gears.

The case 20 is constructed with coaxial front (left) and rear bearings 21 and 22 of conventional design, by which a front stud shaft 23 and rear hollow stud shaft 24 are mounted, these shafts being rigid parts of a rotor 25 having quadriradiate pins 26 springing from circular flat faces 27 (see Figs. 2 and 5) the planes of which are normal to each of these pins. Freely revoluble on each pin there is a planet bevel gear 28, the pins extending through these gears into a rotor case to be described, and the gears being finished with spherical outer sides 28a having a common center with the radii of the pins in the axis of the rotor.

Meshed with the planet gears at the ends of the rotor, are the bevel sun gears 29 having hubs 30 fitted revolubly around the shafts 23 and 24. The rotor has spherical end surfaces 32 and continuations of the surfaces around the flats, to which the planet gear teeth conform. The gears 29 have concave spherical faces 29a fitted to the rotor, and convex spherical outer surfaces 29b extending from near the hubs to their toothed edges, these surfaces having the same center as the centers for the outer faces of the planet gears, so that when the sun gears are meshed with the planet gears the outer surfaces of all form a substantial part of a complete sphere.

Figure 7:
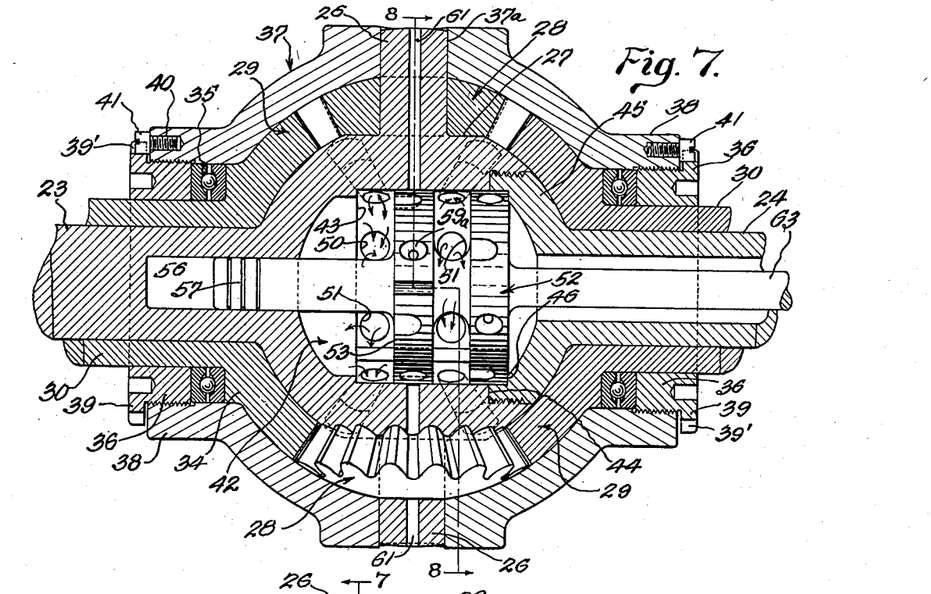
Figure 7 is a vertical section on the axis of the sun pinions the line of section being indicated in Figure 8 by the line 7—7, the valve being in elevation therein and in open position.
Figure 8:
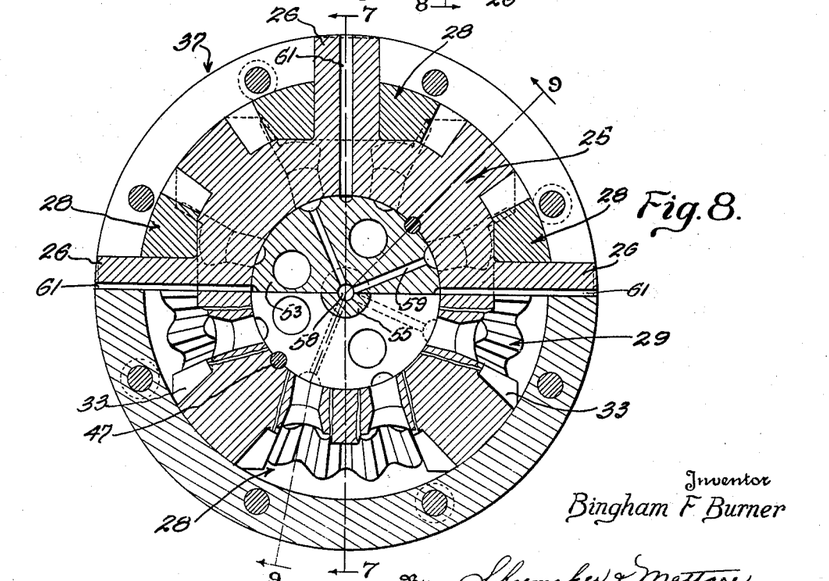
Figure 8 is a transverse section on the line 8—8 of Figure 7.
Figure 9:
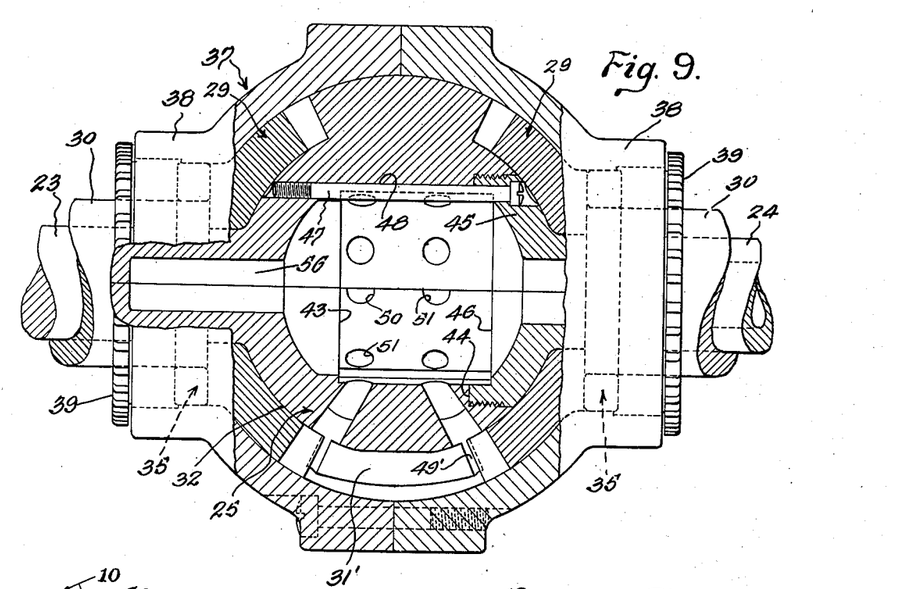
Figure 9 is a section substantially on the line 9—9 of Figure 8, the valve being removed and portions of the rotor housing being in elevation.

The rotor has four abutment extensions 31, each having conical ends 31' presented to and inclined as the teeth of the sun gears, and concave curved sides 33 fitted to the planet gears. The radial faces of the abutments 31 are spherical and flush with the external spherical faces of the gears, as shown. The sun gears in Figures 1, 2, 7 and 9, are formed with concentric cylindrical bosses 34 immediately adjacent to their hubs 30, finished with planiform faces or shoulders in planes normal to the axis of the hubs, and against these shoulders there are set inner races of ball thrust bearings 35, the outer races of which are pressed toward the inner ones and against the intervening balls by means of adjuster rings 36 screwed into respective ends of a spherical rotor case 37 interiorly shaped and smoothly finished to fit the spherical surfaces of the gears and the abutments 31 as best shown in Figures 7, 8 and 9.

The rotor case 37 is a split member in identical halves meeting and bolted together at a diametrical plane normal to the axis of the rotor, and having integral thick annular hub parts 38 interiorly threaded to receive the threads of the rings 36.

The rings are formed with circumscribing planiform flanges 39 having uniformly spaced crenelations 39' in their peripheral edges, the bottoms of the crenelations being semicircular, with centers aligned with a circle intermediately of the thickness of the ends of the respective adjacent hubs 38.

In the end face of each hub 38 a series of tapped holes 40 is formed, centered on said circle and spaced uniformly around the hub, but at intervals different from those of the crenelations, and of a suitable size to receive a screw 41 adapted to fit snugly into an aligned crenelle 39' of the hub. By this means the rings 36 may be rotated so as to secure a nice adjustment of the adjacent bearings and at any position in their rotation in the rotor case, one of the crenelations will be nearly or quite aligned with one of the holes 40, allowing insertion of the screw to hold the rings as adjusted.

The meeting edges of the rotor case halves are notched as at 37a to fit snugly around the pins 26, the ends of which are substantially flush with the exterior surfaces of the rotor case.

The rotor is formed in two parts, one major part integral with the left or front stud shaft 23 being truncated in a plane to the right of the flats 27 around the pins 26, and bored to form a cylindrical chamber 42 therewithin concentric with the axis of the rotor and opening toward the right end of the device. This bore stops at an inner shoulder 43 and is enlarged to form a shoulder 44 and interiorly threaded to receive, screwed thereinto and against the shoulder 44, an end piece 45 concave on its inner surface and formed with a shoulder 46 as the right hand limit of the cylindrical part of the chamber. This end piece carries the hollow stud shaft 24 integral therewith. It is secured in the rotor by two or more filister screws 47 engaged through counter-sunk holes in the end piece 45 and semicircular longitudinal grooves 48 in the cylindrical bore in the rotor body, and the extremities of the screws are engaged in threaded holes in the left end of the rotor body, as may be seen in Figure 9.

Figure 1:
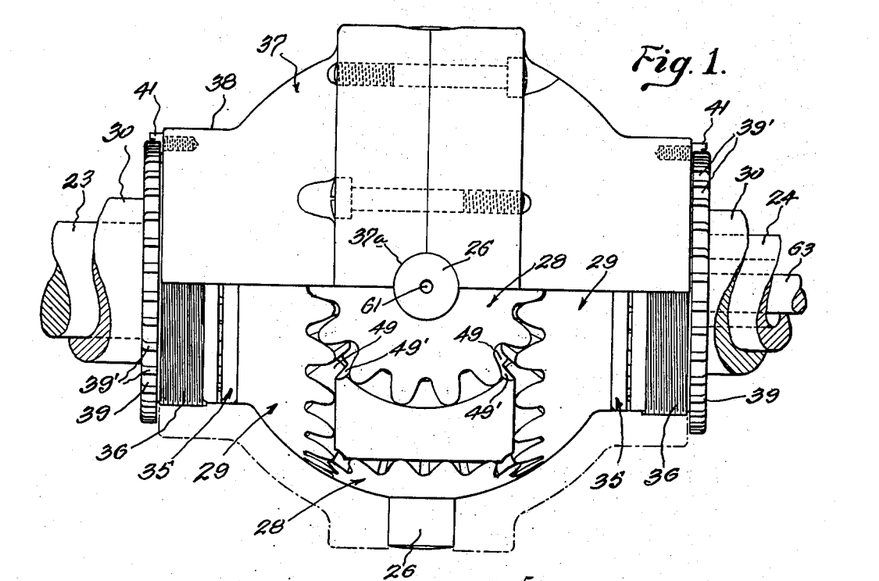
Figure 1 is a view partly in side elevation and partly in longitudinal section of a clutch constructed in accordance with the present invention.
Figure 1B:
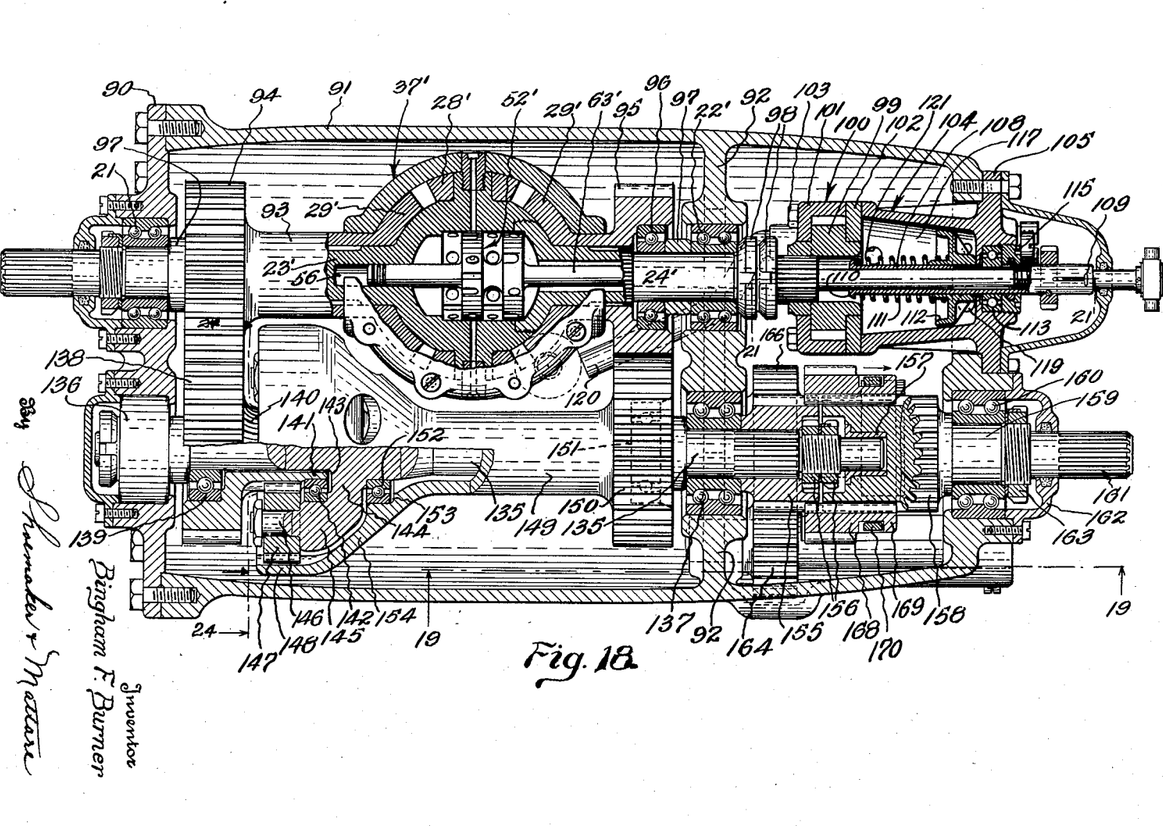

With the arrangement of gears described, it will be seen that there are four of the abutments 31, forming between them within the rotor case 37 and between the planet gears, four pump chambers 49, Figure 1. At each end of the conical sides of each abutment, instead of a sharp junction of this side with the concave end face next to the planet gear, the corners or projections on the abutment are truncated or cut short, so as to form an always clear space 49' at the points of convergence and divergence of the meshing and unmeshing gear teeth. There are four of these spaces 49' at each planet gear. Directly under these intersections of the paths of the sun and planet gears, inlet and outlet ports 50 and 51 are formed through the wall of the rotor, these ports extending convergently toward the medial diametrical plane of the rotor normal to the rotor axis, so that the ports are spaced more closely to each other longitudinally of the chamber 42 within the rotor. The ports are thus arranged in two annular series spaced from each other longitudinally of the cylindrical bore in the rotor. The spacing between the two series is preferably materially more than the diameter of the inner ends of the ports.

Assuming that the device is being used in a transmission of the most extreme simplicity wherein the right hand sun hub gear is utilized as the power take-off always in the same direction, it will be appreciated that turning of the rotor will cause the planet gears to travel on the right-hand sun gear, the planet gears rotating counterclockwise as viewed from the exterior of the device, and that the left hand sun gear consequently will be caused to rotate at twice the rate of the rotor, as long as there is no restriction of the action. It is intended, however, that the interior of the rotor and the spaces within the teeth of the gears beyond their intermeshing parts shall be filled with a liquid of minimum viscosity suitable for the use, and in this operation the liquid will be drawn inward through diagonally opposite ports 50 in each chamber 49 by the unmeshing of the gears thereover, and expelled at the other two ports 51 where the gear teeth are meshing and so expelling the liquid, whose only path of escape is then through these ports 51. Since the case 37 is fitted closely to the gears continuously throughout their outer sides, with no ports or openings for escape of the liquid, the only movement of such liquid will be outward through the inlet ports 50 and inward through the ports 51, there is thus a circulation of the liquid from the chamber 42 through ports 50 and back to the chamber 42 through ports 51 unless this flow is restricted in some manner.

The invention contemplates means to maintain a supply of liquid completely filling the spaces in the chambers 42 and 49 around the gears, and to control the flow of the liquid through the ports, and while the particular means for the control of flow is preferred substantially as disclosed, other means, some well known for maintaining the liquid supply within the rotor, may be substituted for the particular one here shown.

The control for liquid flow comprises a reciprocating spool valve 52 shown in detail in Figures 10 to 13 inclusive, comprising two integral cylindrical disc heads 53—54 at left and right fitted slidably in the chamber 42 and connected to each other by a small coaxial hub 55. These heads are transversely ported at their inner parts for free flow of the liquid therethrough from end to end of the cylinder. The heads are each of a thickness longitudinally of the valve greater than the diameters of the ports 50—51 and are spaced apart so that the clearance between the two heads is also greater than the diameters of the ports, and so that the heads may be set in covering relation to both series of the ports at one position of the valve, or, as in Figure 7 may be shifted so that both sets of ports are partly or entirely uncovered. In the case of both sets of ports being uncovered, one head will be at the right against the shoulder 46, while the other is located between the two series of ports and the right hand set of ports will open to the space between the heads. A pressure cylinder 56 is bored a short distance into the shaft 23 from within the chamber 42, and the valve 52 has an integral coaxial longitudinal piston extension 57 fitted to the cylinder 56 and axially bored as at 58, see Figures 10 and 13, from its forward end to the middle of the rear head 54.

Figure 10:
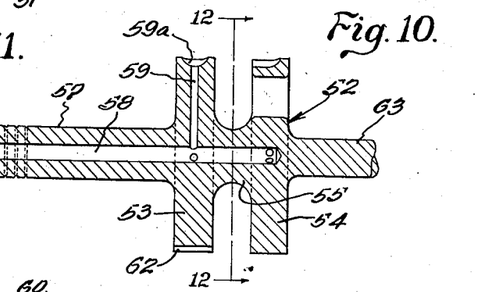
Figure 10 is a longitudinal section of the valve on the line 10—10 of Figure 11 in its left half and on line 10—10 of Figure 12 in its right half.
Figures 12, 13:
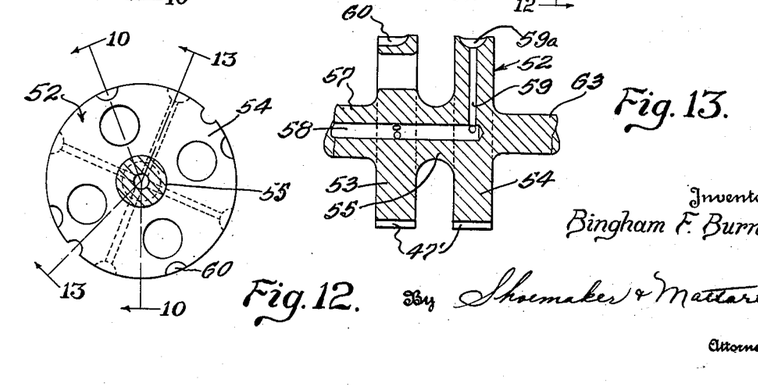
Figure 12 is a transverse section on the line 12—12 of Figure 10.
Figure 13 is a section of the valve on the line 13—13 of Figure 11 in the left half, and on the line 13—13 of Figure 12 in the right half.

Each of the heads is radially bored at 59 from the bore 58 outward, in line with each discharge port 51 in the rotor, the outer ends of the radial bores being enlarged as at 59a so as to remain in lap with the ports under a degree of longitudinal movement of the valve in the rotor. The bores 58—59 constitute ducts from the discharge ports 51 to the cylinder 56. Opposite each of the intake ports 50 a longitudinal groove 60 is formed in the periphery of each valve head. In this way, when the valve is at the inner limit of its movement longitudinally in the rotor, which is defined by the shoulder 43, against which the valve may stop, radial bores 59 leading into the axial bore 58 through the piston are aligned with the discharge ports 51 of the rotor pump chambers 49, and grooves 60 register with the intake ports 50, forming communication from the latter to the interior of the valve chamber 42.

The two heads are also grooved as at 47' to slidably receive the inner halves of the assembly screws 47 whereby the valve is held against rotation relatively to the rotor.

Each of the pins 26 is axially bored, forming ducts 61 opening through the inner face of the valve chamber and on the outer extremities of the pins for vent of liquid from within the rotor, grooves 62 being formed longitudinally in the periphery of the forward or left-hand head 53 only for access of liquid to these ducts when the valve is in full open position, as in Figures 7 and 8.

For operation of the valve an axial stem 63 is formed integrally therewith, extending to the right or rearwardly through the hollow shaft 24 and exteriorly of the transmission case 20, where means is provided for manually or pedally operating the valve at will, or for its automatic operation, as may be desired. In the illustrative instance, a seat collar 64 is pinned to the stem spaced outwardly from the rear end part of the case sufficiently to permit inward movement of the stem to valve closing position, and an operating collar 65 is slidable on the stem spaced from the collar 64, confining a helical spring 66 loosely around the stem against the seat collar. A stop collar 67 is pinned to the stem outward of the collar 65. The collar 65 is grooved and receives the fingers or shoes 68 of a shifting lever, not shown, or other member for operating the valve in its reciprocation. The spring, however, will permit a limited yielding of the valve toward the right by hydrostatic pressure built up in the cylinder 56, by liquid forced inward through the ducts 59 and 58 by the pump units. This pressure will be in proportion to the load torque and the strength of the spring, as will appear.

For maintenance of oil in the rotor with some excess which may be vented through the ducts 61, a simple gear pump 69 of conventional design is carried in a small cap case 70 bolted to the rear face of the case 20 around the stem, one gear 71 of the pump being splined to the extremity of the hollow shaft 24, which stops within the cap case. The latter is cored as at 72, to form a duct from the discharge side of the pump communicating with the open end of the shaft 24 within the cap case, and the latter is provided with a conventional packing 73 around the stem 63 where it passes through the cap case. A retainer plate 74 for the rear shaft bearing 22 is clamped against the main case 20 by the cap case, and forms the inner side of the gear pump assembly 69.

As a conventional example of power take-off (which may be of various forms suited to situations where a clutch is needed, and adaptable to different gear or power transmission systems), a counter shaft 75 is illustrated mounted parallel to the axis of the rotor and shafts 23—24 in front and rear bearings 76, 77 in the main case 20. This shaft happens to extend through the rear of the case 20 in the present instance and has spline grooves 78 milled thereon to receive pulley couplings or gears to be driven. One-to-one gears 79 and 80 meshed in drive and driven relation are splined respectively on the shafts 30 and 75 within the case 20.

As an example of one possible use, an intake pipe 81 is extended from the pump 69 to the lower part of the interior of the case 20, so that oil in which the gears 79—80 run may also be used as the hydraulic liquid for the clutch.

In the operation of the invention, assuming that a load is imposed on the countershaft 75, and that the shaft 23 is driven by a prime mover, the valve being at the right limit of its movement, or in open position as shown in Figure 7, the clutch will be in idling or neutral position transmitting no appreciable torque. In this condition, the right sun gear is stationary, and the left sun gear rotating at twice the speed of the rotor. Liquid is being taken into the pumps through the intake ports 50, and discharged through the ports 51, without restriction, into chamber 42. When clutching is desired, the shifting means at 68 is operated to press the stem of the valve inward, the spring 66 serving as a resilient connection between the stem and collar 65. The valve heads gradually restrict the discharge ports 51, building up a pressure head therein and communicating this to the interior of the cylinder 56, through the radial and axial ducts 59—58 in the valve. As long as the right hand sun gear is stationary there will be a very rapid operation of the pump units represented by the planet gears 28 and coacting portions of the two sun gears, and the hydrostatic pressure in the cylinder 56 will be proportionate to the degree of cut off effected by the valve and the index of viscosity of the fluid in the rotor. If the valve is entirely closed, this pressure will increase rapidly until the maximum torque of the prime mover is applied to the right-hand sun gear 29. In the meantime, however, resistance of the spring 66 is overcome sufficiently for the piston 57 to be forced toward the right, moving the valve to partly open position and relieving the hydrostatic pressure by venting the liquid back to the chamber 42. This permits relative motion of the sun and planet gears, which will be rapid at starting and in ascending grades in autos, but slow under light loads. By using a prime mover of potential power proportionate to the load applied to the counter shaft, and proper adjustment of the spring 66, the driven shaft 30 and counter shaft 75 will gradually accelerate on starting under load, by corresponding movement of the right-hand sun gear. While no load is applied to the left-hand sun gear in the present instance, it is useful in its pump function (doubling the fluid output of the pump system), and in aiding in opposing the free movement of the planet gears when the liquid discharge is restricted at the ports 51. When the rotation of the planet gears is opposed, greater torque is applied to the right-hand sun gear. As the latter begins to turn, the relative movement of the planet gears and the left sun gear with respect to the right sun gear becomes less, and the volume of discharge of liquid past the valve decreases, with some tendency for the hydrostatic pressure in the cylinder to decrease and allow further closing of the valve through action of the spring 66, so that the torque is sustained uniformly through the varying load as inertia is overcome. As the valve closes, the force of the spring becomes less and the lower hydrostatic pressure in the cylinder again balances the spring. In case of exceptional resistance of the load to initial movement of the driven parts, the relieving action of the spring 66 may be neutralized and exceptional high torque applied by application of additional force to the shifting means 68. A sudden movement of the shifter in valve-closing direction will serve, by flywheel effect in the prime mover, to overcome greater load inertia, and by promptly relieving the additional force so applied to the shifter, stalling of the drive means may be avoided. In these respects my clutch may be utilized to obtain all advantages of conventional clutch and transmission devices, with the additional advantages peculiar to my invention and to hydraulic transmissions and clutches. The hub of the left sun gear may be utilized to drive a low gear transmission as hereinafter more fully described, the present valve device being actuated or governed by automatic controls, as will be more fully disclosed.

Figures 15, 24:
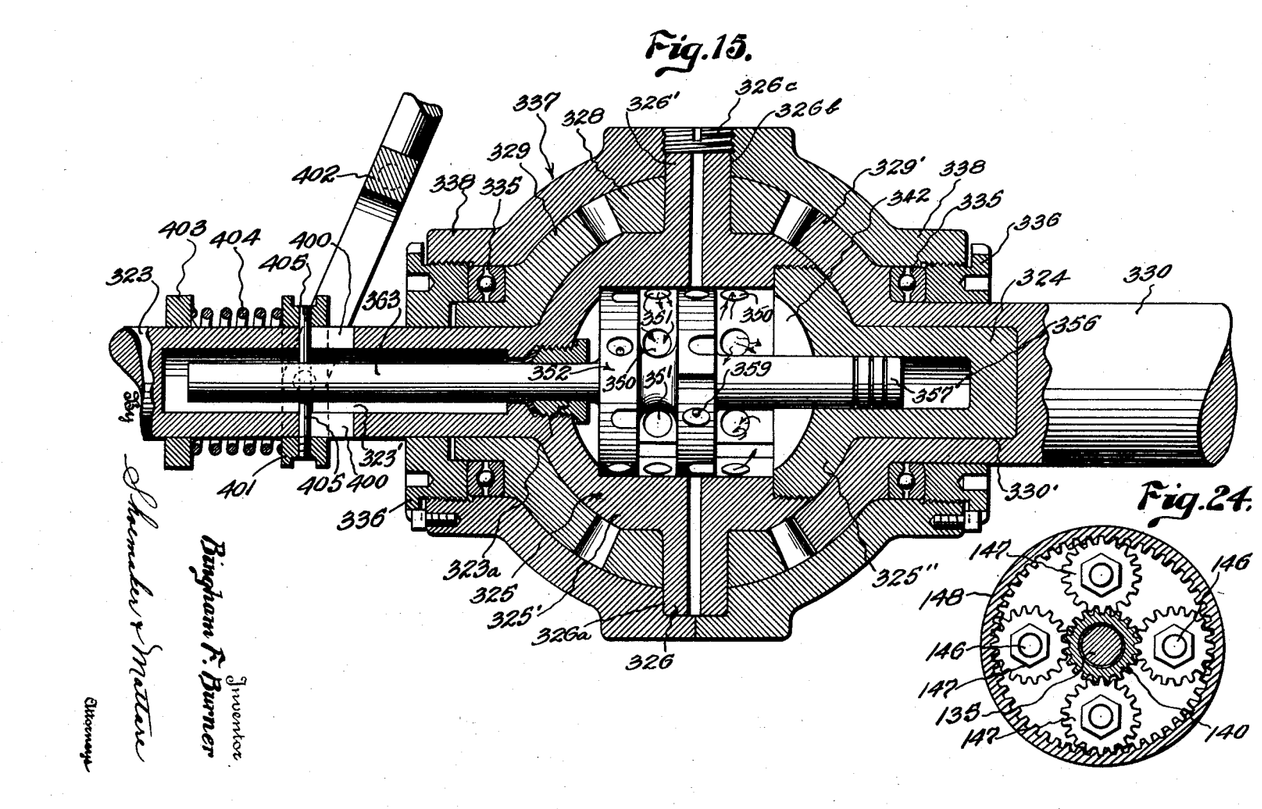
Figure 15 is a vertical longitudinal section showing the application of the invention to a power transmitting mechanism which is designed to function as a combination clutch and over load release.
Figure 24 is a section taken substantially on line 24—24 of Figure 18.

In Figure 15, there is illustrated a modification of the power transmitting mechanism which is designed to function as a combination clutch and overload release. Use might be made of this modified structure in connection with the transmission of power from a prime mover to a machine which is subjected to sudden overloading strains and wherein the application of such strains calls for quick disconnection of the prime mover from the driven machine in order to avoid either stalling the prime mover or damaging the driving connection between the same and the driven machine.

This overload release mechanism would be installed in a power transmission shaft without the benefit of an enclosing casing or housing such as the housing 20 in which the rotor case 37 is shown installed in Figure 14. Accordingly, the spherical rotor case 337 of the present modification would be completely closed against the escape of oil therefrom.

This rotor case may be formed in two sections in the same manner as the rotor case 37, each of the two sections terminating in a hub 338 in each of which is fixed a ball thrust bearing 335, maintained in place by the adjuster rings 336.

Within the rotor casing is the rotor body 325 which comprises the main portion 325' and the detachable portion 325" which is threaded into the main portion in the manner shown and in the same manner as the first described rotor 25 is constructed.

The rotor portion 325" is formed integral with the stub shaft 324, which stub shaft has the cylinder 356 formed therein and which opens into the valve chamber 342, which is formed in the rotor body.

The portion 325' of the rotor body is formed integral with the power transmitting shaft 323, the rear end portion of which is formed with the axial bore 323', which opens into the valve chamber 342 through a packing gland 323a fitted into the rear end of the bore from the valve chamber in the manner shown.

Figure 2:
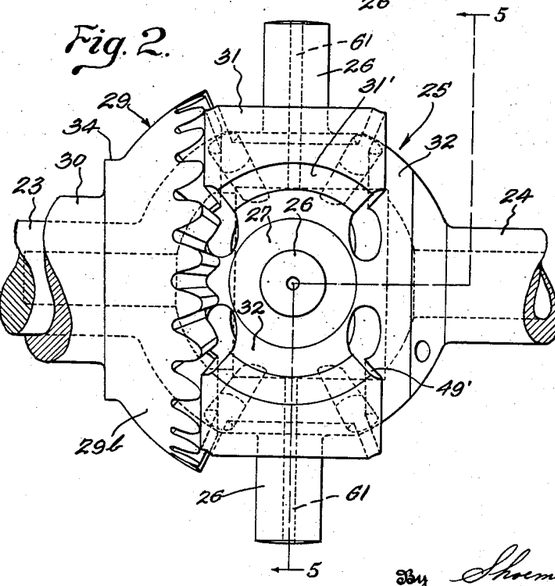
Figure 2 is a view in elevation of the left sun pinion and rotor only.
Figure 3:
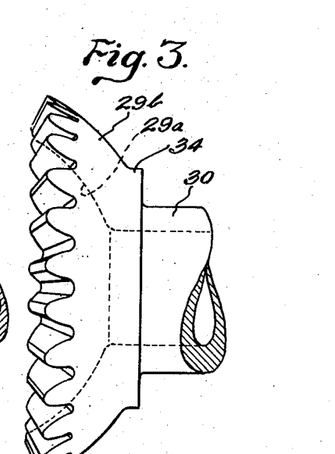
Figure 3 is a view in elevation of the right sun pinion in a relation to Figure 2 ready to be moved axially to operative position on the rotor.
Figure 4:
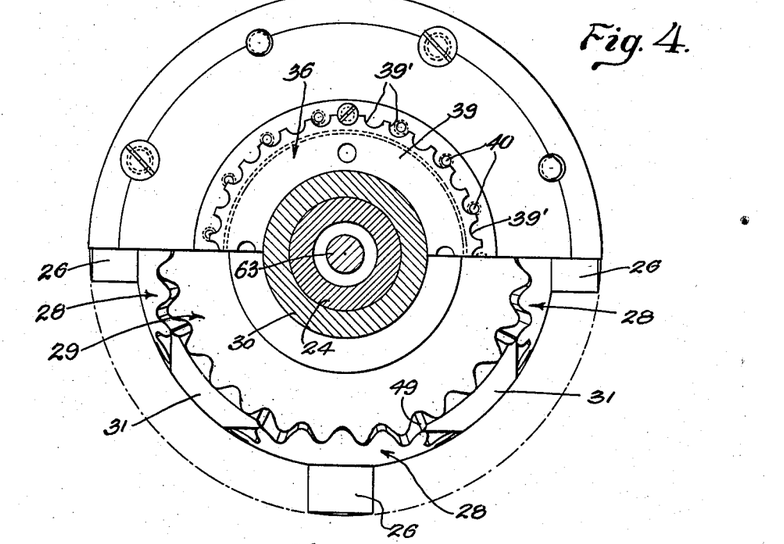
Figure 4 is a view in elevation from the right of Figure 1 with the lower half of the rotor case removed.

The rotor 325 is of the same form or construction as the rotor 25 which is illustrated particularly in Figure 2 and it is accordingly believed to be unnecessary to describe this rotor in detail except to state that the quadriradiate pins which carry the planet gears 328, are materially shorter than the pins 26 for the purpose about to be described. Three of these pins, one only of which is shown and designated 326, are of the same length and the fourth one designated 326' is considerably shorter than the other three. The pins 326 and 326' are respectively secured in sockets 326a and 326b formed from the inner side or inner wall of the casing 327 as shown. The ends of the pins 326 are covered by the sockets in which they are located while the socket 326b is closed at its outer end by the removable nut 326c. This is provided to facilitate the introduction of fluid into the rotor chamber 342. When the necessary quantity of fluid is within the chamber, the closing of the outer end of the socket 326b by the nut 326c, completely seals the unit so that the fluid is maintained against escape.

The numerals 329 and 329' designate sun gears which are fitted in the rotor casing against the forward and rear sides, respectively, of the rotor body 325. As shown, the sun gear 329 is completely encased in the rotor casing 337 while the gear 329' forms an integral part of the power take-off shaft 330. The inner or forward end of this shaft 330 has the bearing socket 330' formed therein and opening through the center of the gear 329' to receive the stub shaft 324 which forms a part of the rotor body.

The power or drive shaft 323 has the opposite longitudinal slots 400 formed therein outside the rotor casing and opening into the bore 323'. Encircling the shaft 323, in the plane of these slots 400, is a shift fork collar 401 with which is coupled a shift fork 402 or any other suitable mechanism by means of which the collar 401 may be moved axially of the drive shaft.

Fixed to the drive shaft is a thrust collar 403 the same being upon the opposite side of the ring 401 from the rotor casing, and between the collar 403 and the ring 401 is an expansion spring 404 which normally urges movement of the ring 401 rearwardly or toward the rotor body.

Figure 11:
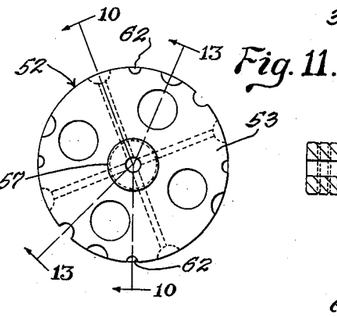
Figure 11 is a view in end elevation of the valve viewed from the left as positioned in Figure 7.

Within the chamber 342 of the rotor body is a valve spool unit 352 which is of the same form or construction as the spool valve 52 which is shown in detail in Figures 11 to 13 inclusive. The longitudinal piston 357 of this spool valve 352 fits snugly in the cylinder 356 while the axial stem 363 of the spool valve passes through the packing gland 323a into the bore 323, extending beyond the slots 400.

The stem 363 of the spool valve is operatively coupled to the shift collar or ring 401 by the coupling pins 405 which are threadably secured to the ring 401 and extend through the slot 400 through the stem 363 in the manner shown.

As previously stated, the rotor body 325 and also the spool valve 352 are of the same construction as the corresponding units 25 and 52 hereinbefore described. Accordingly, it will be apparent that upon the functioning of the planetary gears 328 as pumps, fluid will be taken from the chamber 342 through the ports 350 and returned to the chamber 342 by way of the ports 351.

The spring 404 normally urges the spool valve 352 in a direction to cover the ports 350 and 351 and consequently at the beginning of rotation of the power shaft 323 the fluid under maximum pressure will be caused to pass into the radial passages 359 of the spool valve and then through the stem 357 through the passage, not shown, corresponding to the passage 358 of the valve 52, into the cylinder 356. This will tend to shift the spool valve back against the tension of the spring 404 until the ports 350 and 351 are uncovered so that there may be a free circulation of the fluid through the chamber and through the gear pump. The constant tendency of the spring 404 will be, however, to shift the spool back into a position where the ports 350 and 351 are covered so that a constant yieldable resistance will be set up to the free flow of the fluid through the ports and the power of the driving shaft will be applied in increasingly greater force to the gear 329' as rotary motion is imparted to this gear and to the shaft 330. As the torque strain of the shaft 330 lessens, the rotation of the planetary gears 328 and the sun gear 329 will decrease until the shafts 323 and 330 together with the intermediate coupling parts are turning as a unit. When this condition is reached, the springs 404 will have moved the spool valve 352 to the extreme rearward position where the ports 350 and 351 are covered.

In the event that a sudden or unexpected load is applied to the shaft 330 this will tend to decrease the rotation of the shaft and the gear 329' and will set up rotary motion in the planetary gears and the sun gear 329 whereupon the sudden surge of fluid pressure through the passages of the spool valve into the cylinder 356 will effect the forward shifting of the spool valve and the compression of the spring 404 whereby to immediately decrease the coupling connection between the sun gear 329' and the power or driving shaft.

If it is desired to hold the spool valve 352 against forward movement under the action of fluid forced under pressure into the cylinder 356, this may be accomplished through the manual shifting and holding of the spool valve by means of the fork 402.

Figure 16:
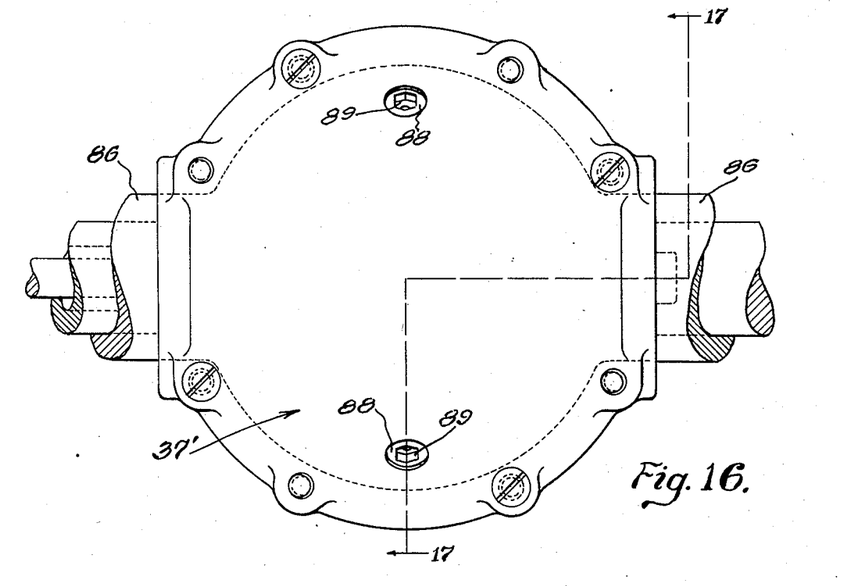
Figure 16 is a view in elevation of a modified embodiment of the clutch unit, the view corresponding to Figure 1.
Figure 17:
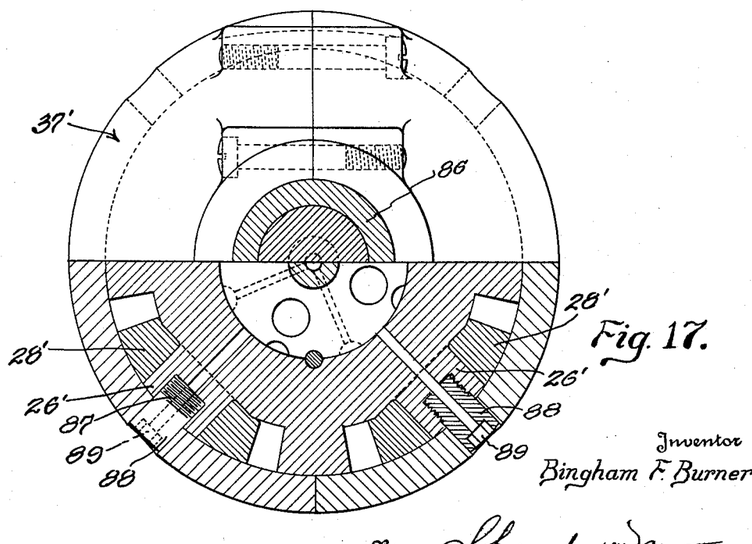
Figure 17 is a view from the right of Figure 16, the lower half of the unit being in section in the vertical plane of the axis of rotation as indicated by the line 17—17 on Figure 16.

In Figures 16 and 18, the rotor case 37' and the rotor are of modified form to the extent that instead of the halves of the case 37' meeting at a plane normal to the axis of the rotor, they are joined in a diametrical plane, and the antifriction bearings are omitted. For this case the pin studs 26' as shown in Figure 17, cannot extend entirely through the case, but are finished flush with the inner face of the case and with the convex spherical surfaces of the planet gears 28' which rotate thereon as in the case of the pins 26. The rotor and gear structure are otherwise as before described, except that the sun gears 29' Figure 18, do not require the shoulder bosses 34 before described. The opposite halves of the case 37' here are fitted snugly to each embrace one half of a hollow hub 86 of a sun gear, which may be extended as required, according to the uses of the apparatus. The case halves may be bolted together substantially as before described.

The extremities of the pin studs 26' are drilled and tapped to receive screw studs 87 with cylindrical heads 88 fitted to corresponding radial bores in the case 37', there being two of the studs 87 in each half of the case. The pin stud screws in this instance are axially bored to form vent ducts from the rotor, and the screw studs have angular wrench-receiving recesses 89 in their outer ends, to facilitate removal and replacement by the use of suitable wrenches.

Figure 19:
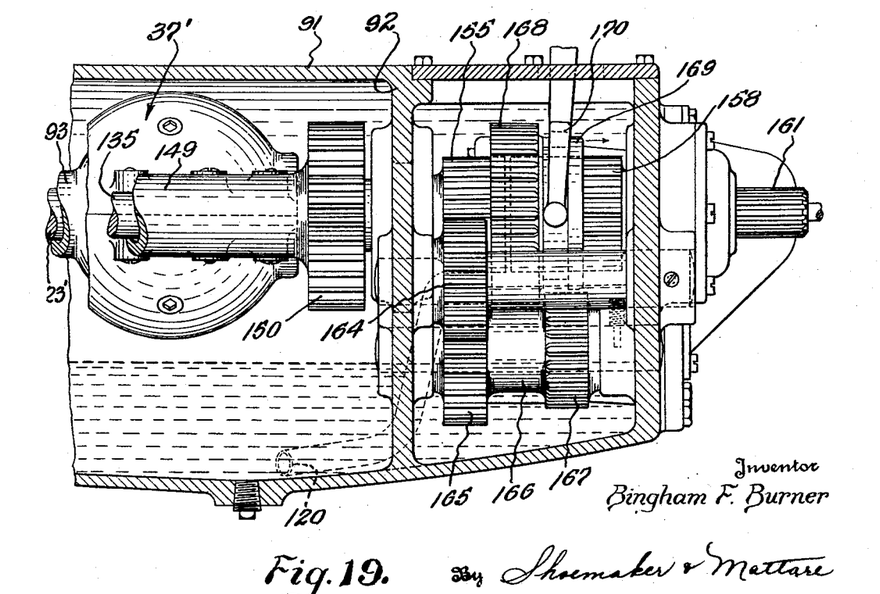
Figure 19 is a sectional view taken substantially on the line 19—19 of Figure 18 illustrating the transmission gears.
Figure 20:
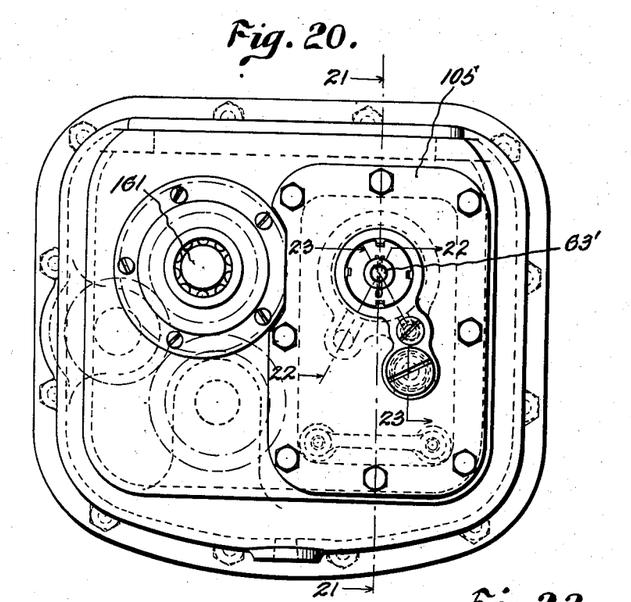
Figure 20 is a view in rear elevation of the transmission case.

In Figures 18 and 19 there is illustrated a transmission utilizing the invention in which power take-off is provided from each sun gear and the take-off at the two sun gears is differentiated and transmitted through trains of different ratios so that a positive utilization of gear transmission is availed at the same time that an infinite graduation of the ratio may be effected from the extreme low gear transmission to a maximum high gear transmission, which may be what is called commonly an "overdrive," or may be some conventional ratio proportionate to the power rating of the power plant and normal torque requirement.

In this instance, on account of limitations of design, space and accessibility within a transmission case, the type of case and rotor of Figures 16 and 17 is employed, generally indicated at 37' in Figures 18 and 19 and requiring no further detailed description than that already given.

The left sun gear 29' of this unit has extending therethrough a rotor stud shaft 23' substantially the same as the one 23, except that it is longer, and is mounted in a bearing 21' carried in a front plate 90 bolted to an end of a relatively long case 91. This case has an integral transverse interior cross head 92, carrying a forward bearing 22' in which the hollow stud shaft 24' from the rotor clutch unit is journaled. This shaft is likewise somewhat longer than the shaft 24.

The hub 93 of the left or forward sun gear is extended some distance beyond the case 37' for a purpose which will appear, and next to the front plate 90 it has an integral left pinion 94 formed thereon. The hub of the right sun gear 29' has integrally formed thereon the right pinion gear 95, which in this instance is the same size as the left pinion, but is closely adjacent the case 37' and cross head bearing 22'. This gear 95 is counter bored at the right side to receive a ball bearing set 96 by which it is supported on the shaft 24'. The left pinion gear 94 may be similarly counter bored at its left side and fitted with a ball bearing to support it on the shaft 23'. Spacer collars 97 are set around the shafts between the inner races of the bearings in the pinions and the bearings in the case so that the unit 37' is spaced properly longitudinally in the case.

The shaft 24' is extended rearwardly of the bearing 22' and threaded to receive assembly nuts 98 against the inner race of the bearing, and beyond these is splined to receive thereon a gear 99 of a gear pump 100. The latter gear has a hub portion at front and rear fitted revolvably in the forward wall of the case 101 and in the rear cover plate 102 of the pump. The shaft 24' stops short of the middle of the gear 99 leaving the remainder of the bore through the gear clear. The body and plate 101—102, have bolts 103 extending therethrough from the front and engaged in a frusto-conical governor case 104, Figures 18 and 21, which is formed integrally with a rear cover plate 105 bolted to the outside of the transmission case 91.

The stem 63' of a rotor valve 52' is extended through the shaft 24' through the pump gear 99, through the governor case 104 and out through the plate 105 and beyond to such distance as necessary for the uses to be described. The valve 52' here used is identical with that before described herein and the chamber in the rotor and the cylinder 56 are the same as before described, with the same ports, ducts and other details in the valve and rotor, as before described. The valve tends to be moved to the right by hydraulic pressure in the cylinder, and a governor device, to be described, automatically moves the valve against the force of hydraulic pressure in the cylinder to effect clutching or transmission according to a predetermined range of speed of a pump by which the governor is actuated. The pump is directly connected to the rotor and so the speed of the pump is also a component of the transmission output speed.

A spring seat sleeve 108 encloses the stem 63' and has threaded engagement with the stem outwardly from the rear plate 105 of the transmission case. The sleeve is longitudinally slotted at opposite sides rearwardly of the plate 105 and a pin 109 is engaged through the stem and through this slot to hold the sleeve against turning on the stem. The forward end of the sleeve is flanged to afford a spring seat 110 against which there is seated a helical spring 111 which extends rearwardly and bears against a governor baffle vane 112 slidable on the sleeve within the governor case 104 and constituting the governor element proper. This vane normally is held against the rear wall of the governor case, in which is mounted one race of a bearing 113, the wall 105 being bored deeply from the rear therefor to receive the bearing and also a packing ring 115. The bearing is fixed to and supports the sleeve 108. The governor case 104 is interiorly moderately tapered toward the rear, forming a chamber 117, the smaller end of which is toward the rear and the governor vane sets in the smaller part of the chamber nearly but not quite closing the passage therethrough for fluid from the smaller to the larger end. The chamber 117 has a length somewhat more than sufficient to permit full operative movement of the stem 63' under twice that extent of movement by the vane 112, the force of fluid pressure delivered in cylinder 56 and the strength of the spring 111 being so proportioned that at one adjustment of the tension of the spring 111, such ratio of movement of the valve and vane will be involved before the valve is closed.

The tension of the governor spring 111 is adjusted by removing the pin 109 and rotating the sleeve 108 to further compress the spring 111 between the seat 110 and the vane 112, or to relieve the spring tension. The adjustment to compress the spring will cause the vane, upon movement, to effect closing of the valve in less relative movement of the vane.

An extreme adjustment of the device may be attained where the movement of the vane and the valve will be identical. At all times, however, the spring 111 will tend to move the vane in a direction to open the valve.

Figures 21, 22, 23:
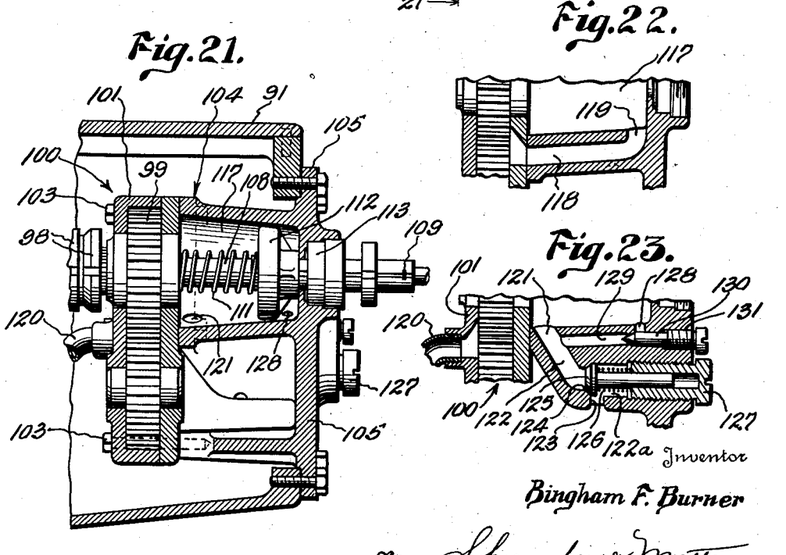
Figure 21 is a fragmentary vertical section of the pump and fluid pressure regulator, taken substantially on the line 21—21 of Figure 20, parts being removed.
Figure 22 is a fragmentary longitudinal section at the intake of the pump, taken substantially on the line 22—22 of Figure 20.
Figure 23 is a similar sectional view at the discharge of the pump to the pressure regulator, pressure check and by-pass, taken substantially on the line 23—23 of Figure 20.

In attaining the function of the governor, the discharge port of the gear pump 100 is put in communication with the extreme rear end of the conical chamber 117 by a duct 118 cored in the casting forming the case 104, and opening through a rear inlet port 119 next to the plate 105, Figure 22. The vane 112 has a hub portion which engages the plate 105 so as to hold the vane forwardly of the port 119. At the extreme forward part of the chamber 117 the intake of the gear pump 100 has a pipe 120 opening thereinto from the lower part of the transmission case 91, this pipe being set in the pump case 101. At the extreme forward part of the chamber 117 a relief port 121 is formed in the side wall thereof from which a cored passage 122 extends in the casting to a return port 123 opening through the lower side of the chamber body, the latter being thickened for this and other passages into the transmission case. A bored passage 122a is formed through the rear face of the plate 105 horizontally, and extending across the port 123, affording a seat 124 around the lower end of the duct 122 against which a valve 125 is seated to close the relief duct. The valve is held to its seat by a spring 126 confined by a hollow screw 127 engaged in the outer threaded part of the bore 122a, in which the stem of the valve 125 is slidable. Adjustment of this screw determines the pressure at which fluid will be relieved from the governor chamber.

Any means, not shown, may be provided for positively operating the valve stem 63' manually or otherwise from some external source, and it may if desired conform to the operating means referred to in connection with Figures 1 to 16.

As a means for modifying the action of the governor, a relief port 128 is formed in the wall of the chamber at the same end with the inlet port 119, as shown in Figure 23, opening into a by-pass duct 129 extending to the cored passage 122. The flow in the by-pass is regulated by a needle valve 130 engaged in a bore 131 opening from the rear face of the plate 105 and extending across the port 128 to close or open the latter. The valve is slotted across its outer end and threaded at its outer part and screwed into a corresponding threaded part of the bore 131, so that the needle valve may be adjusted by a screw driver at the rear of the transmission, the same as the screw 127.

A solid counter shaft 135 is mounted parallel to and at the same level with the shafts 23' and 24' of the rotor, in antifriction bearings 136 in the front of the transmission case, and a similar bearing 137 in the intermediately located cross head 92. On the forward end of this counter shaft there is revolvably mounted a gear 138 meshed with gear 94 and of the same size, bored at its forward side to receive a ball bearing assembly 139 fitted to the shaft 135, the gear having a rearward small pinion extension 140 and hub 141, the latter having fitted thereon a ball bearing unit 142 which is set within a channel 143 formed in an enlargement 144 shown as formed integrally on the shaft 135. The enlargement 144 is formed with radial lugs 145 to which there are fixed parallel stud pins 146 carrying small gears 147. An internal gear 148 is set around and meshed with the small gears 147, and forming part of a hollow shaft and double gear member 149 the second gear of which is a spur gear 150 of the same size as the gears 94, 95 and 138, the gear 150 being meshed with the gear 95. The double gear has a reduced hollow shaft portion set concentrically around the shaft 135 and supported on the latter by ball bearings 151 set in the gear 150, and a similar ball bearing 152 on the counter shaft immediately to the right of the enlargement 144, and fitted in an annular cylindrical race seat 153 formed in a bell-like enlargement 154 of the hollow shaft which is formed as a continuation of the internal gear 148.

The shaft 135 is extended rearwardly of the cross head of the transmission case, and has splined thereon a spur gear 155, locked in place by lock nuts 156. The rear end of the shaft is smoothly tenoned and fitted with the pilot bearing 157 set within a long driven or output spur gear 158 of the same size and number of teeth as the gear 155, and having a hub 159 carried in a ball bearing 160 mounted in the rear wall of the transmission case, and having a reduced driven shaft extremity 161 extended through the transmission case and provided with splines rearwardly thereof to receive a conventional coupling or other device. A dust cap 162 is fixed on the transmission case and fitted around a smooth part of the shaft extension 161 of the gear 158. Within the cap 162 the hub of the gear is threaded and receives a lock nut 163 by which the inner race of the bearing is pressed against the gear 158.

The gear 155 is constantly meshed with a reversing gear 164 slightly below and at the left; which is in turn meshed with the forward large gear 165 of a double gear unit 166 further below and to the right. The second smaller gear 167 on this double gear unit is spaced from the first one thereof by a distance equal to slightly more than the thickness of the reverse gear. A sliding gear 168 is engaged on the long gear 158 and is movable to also fit over part of the gear 155, and having an external radius to mesh with the small gear 167 when at the rear of its sliding movement.

The gear 155 extends rearwardly further than the reversing gear 164 sufficiently for the sliding gear to engage over gear 155 in driven relation thereon without coming into the path of the reversing gear 164.

The sliding gear 168 is formed with a longitudinal sleeve extension 169 in which a groove is formed receiving a shifter yoke 170 which may be of conventional construction operated manually or otherwise.

Reverting to the clutch element and its relation to the counter shaft and gear trains, it may be pointed out that when the splined shaft end 161 of the driven output gear 158 is connected to a load, tendency of the gear 158 to rotate is opposed.

Assuming the sliding gear 168 to be at its forward position where the driven shaft is locked with the shaft 135, some tendency for the driven shaft to rotate is developed from the force transmitted from the sun gears 29' through gears 94 and 95 to gears 138 and 150 which tends to carry the small planetary gears 147 around with them. Owing to the resistance to movement of the shaft 135, however, the small gears 147 remain on stationary axes, and the advantage being with the small spur gear 140, as compared to the large internal gear 148 the latter yields so that the force exerted at the gear 95 is overcome and the latter is driven in a reverse direction while the gear 94 is driven in the same direction as the shaft 23'.

The pressure of the spring 111 being properly adjusted, this idling operation may continue at a moderate speed of the prime mover, the operation of the pump at the low speed involving only a moderate flow of the fluid through the governor, and the rate of escape between the periphery of the vane 112 and the wall of the case 104 being sufficient to prevent development of pressure through the spring 111 to overcome the pressure in the cylinder 56 and move the valve into closing relation to the ports of the rotor. When by means of a throttle or other means the speed of the prime mover is increased, the acceleration of the flow of liquid from the pump 100 through the port 119 into the small end of housing 117, results in application of greater force against the vane 112 and movement of the latter to the left until the clearance therearound has been increased sufficiently to accommodate the flow at the pressure established by the volume per unit of time and degree of compression of the spring 111. The proper adjustment will result in the gradual closing of the valve up to a point where the resistance of the load so opposes the further increase of speed of the prime mover that acceleration ceases and no further movement of the governor vane occurs. If the force delivered then through the driven shaft 161 is not sufficient to overcome the inertia of the load it will not be moved unless some exceptional means is utilized. As before indicated an abrupt increase of torque may be derived at the driven output shaft 161, by suddenly operating the manual device or shifter 268 to apply direct external force to the valve stem 63' so as to move the valve 52' further toward closed position so that in addition to the normal power of the prime mover, the inertia of its working parts may be applied by fly-wheel effect in torque at the shaft 161. Many loads thus started may thereafter be kept in motion or the transmission under such load be maintained in proper operation by relieving the external force applied to the valve stem 63' allowing the vane to control and allowing the prime mover at the same time to recover any speed loss due to the conversion of inertia to torque force.

It is believed clear that the output shaft 161 will have one direction of movement with the gear 168 at its forward position, and an opposite or reverse movement when the gear 168 is shifted to mesh with the gear 167.

It should be understood that, as long as the opposition of the load is sufficient to prevent the prime mover from attaining the maximum speed for which the spring 111 is adjusted, the valve is never brought to fully closed position, so that the possibility of some relative motion similar to that in the idling slow speed condition first referred to remains, although opposed in proportionate degree as the valve approaches closed position. When the valve is closed entirely, however, the gears 94 and 95 are locked with the shaft 23', so that they rotate synchronously, and consequently drive the gears 138 and 150 to one speed with similar movement of the gears 138 and 150 and shaft 135. With the gears shown the ratio of movement of the shafts 23' and 135 is 1 to 1. In the operations with the valve partly open, the ratio is progressively greater in proportion as the valve is opened, short of the idling relation. In this operation it should also be appreciated that the effectiveness of the drive is also corresponding. That is to say, if the internal gear 148 were stationary and the drive effected entirely from gear 94 through the small planetary gears and their stud pins to shaft 135, the ratio would be approximately five to one, with the reversal of motion involved, however, as explained this ratio is correspondingly increased, so that from starting conditions it may be from fifteen or twenty to one, and will progressively decrease to one to one in the functioning of the device as explained. Throughout this range of ratio variation it will be seen that there is a positive gear train drive effected between the prime mover connection and the output or driven shaft 161.

Also it may be noted that the transmission train for forward speed need never be interrupted except when the power torque at the driven shaft 161 is to be reversed, and even then it will not be necessary to stop the machine, since, by manipulation of the manual shifter operating the valve stem 63' to move the valve 52' positively to full open position, the planetary system will be freed for idling and the sliding gear 158 may be moved to reverse position.

From the foregoing a full understanding of the nature and manner of constructing and utilizing the invention in the ways referred to will be had, but it will be understood also that this is purely explanatory and that various changes in construction and arrangement, substitution of materials and equivalents, mechanical or otherwise, may be made without departing from the spirit of the invention as set forth in the appended claims.

I claim:
1. A device of the character described comprising a chambered rotor adapted to contain a fluid, a plurality of planet gears revolubly mounted exteriorly thereon, a sun gear revoluble on the rotor and meshed with the planet gears, a case fitted to the gears, said rotor including partition means forming fluid pump chambers at the intersections of the meshed gears, said rotor having intake and discharge ports from respective parts of said pump chambers opening into the chamber of the rotor, a reciprocable valve fitted in the rotor chamber and movable and constructed to cover and uncover at least the discharge ports at respective limits of its reciprocation in the rotor chamber, means to rotate the rotor driven connection with the sun gear, means to operate the valve, and means adapted to be actuated by the pressure of fluid entering the rotor when the valve is in discharge port covering position for effecting movement of the valve away from said discharge port covering position.

2. The structure of claim 1, in which the rotor has a coaxial hollow shaft extended therefrom, a stem extended from the valve through the shaft constituting part of said means to operate the valve, and an external manual operating means for the stem.

3. The structure of claim 1, wherein said rotor has a coaxial hollow shaft at one side, a stem on the valve passing through the hollow shaft and operating connections therefor exteriorly constituting part of said means to operate the valve, said operating connections including a manually operable and fixable movable member and an elastic connection between the same and the stem, and said last means embodying a cylinder in the rotor coaxial with and opopsite the stem, and said valve having a piston fixed therewith and reciprocable in the cylinder, and said valve having ducts opening on its periphery for registry with respective discharge ports and opening through the end of the piston into the cylinder.

4. The structure of claim 1 in which the rotor is formed with spherical surfaces at each end, said sun gear being spherically concave to fit the rotor, said partition means and the sun and planet gears being formed with external spherical surfaces of common radius, and said case being interiorly spherical and fitted commonly to the surfaces of the said gears and rotor partitions and coupled to and fixed in relation to the rotor.

5. The structure of claim 1 with a second sun gear opposing the first and having the planet gears therebetween, rigid radial shafts integral with the rotor and engaged through the sun gears, one of the shafts being bored from the chamber of the rotor through the outer end of the shaft, the last named means comprising a bore in the other shaft extending from the interior of the rotor to form a closed cylinder and a piston fixed with the valve and slidable in said cylinder, and means extended through said one shaft to operate the valve, said last means including an elastic extensible connection.

6. The structure of claim 1, in which said rotor is formed with at least one fixed shaft coaxial with the sun gear, the last named means embodying a cylinder formed in the fixed shaft and opening into the interior of the rotor, a piston formed on said valve and fitted to the cylinder, ducts extending from the extremity of the piston through the valve and opening on the periphery of the valve to register with respective discharge ports, and means to operate the valve including an elastic connection yieldable directly in proportion to pressures in the cylinder.

7. The structure of claim 1, in which the rotor is provided with a fixed shaft at one side coaxial with the sun gear, the last named means embodying a cylinder formed in the fixed shaft and opening into the interior of the rotor and closed at its outer end, a piston fixed on the valve and fitted in the cylinder, said piston and valve having ducts formed therein from the periphery of the valve in alignment with respective discharge ports to the extremity of the piston, a hollow shaft extending from the rotor oppositely from the first mentioned shaft, an operating stem extending from the valve through the hollow shaft, means to actuate said stem including an elastic connection yieldable proportionately to pressure in the cylinder, and means connected with the interior of the hollow shaft to supply liquid to the rotor chamber.

8. The structure of claim 1, wherein the rotor has an axial inlet, said valve having an operating stem extended therethrough constituting a part at least of the means to operate the valve, and a pressure liquid supply means connected to said inlet.

9. The structure of claim 1, wherein the valve clears the intake ports.

10. The structure of claim 1, wherein two opposed sun gears are meshed with the planet gears, said ports being arranged in two parallel circumferential series, the intake and discharge ports alternating in each series, said valve comprising two longitudinally spaced cylindrical heads arranged to align simultaneously with respective series of ports and having peripherally relieved parts aligned with the intake ports forming communication between the intake ports and the interior of the rotor, and constructed to close the discharge ports, said heads being transversely ported to form communication from end to end in the rotor chamber.

11. The structure of claim 1, in which the penultimate means comprises yielding means tending to move the valve to open position, a pump operatively connected with the rotor, a conical chamber, a coaxial piston vane therein of a diameter aproximating that of the small end of the cylinder, and a yielding connection between the vane and the valve.

12. The structure of claim 1, in which the penultimate means comprises yielding means tending to move the valve to open position, a tapered cylinder chamber concentric with the stem of the valve with its small end toward the direction of opening movement of the valve, a piston vane reciprocable in the tapered chamber of a diameter approximating that of the small end of the tapered chamber, a spring seat on the stem inwardly of the piston vane and adjustably fixed thereon, a spring confined between the piston vane and seat, a fluid pump having a discharge, a duct from the discharge of the pump to the small end of said tapered chamber, and a vent from the last named chamber.

13. The structure of claim 1, in which the rotor is provided with a fixed shaft at one side coaxial with the sun gear, the last named means embodying a cylinder formed in the fixed shaft and opening into the interior of the rotor and closed at its outer end, a piston fixed on the valve and fitted in the cylinder, said piston and valve having ducts formed therein from the periphery of the valve in alignment with respective discharge ports and opening through the extremity of the piston into the cylinder, said rotor having a hollow shaft extending oppositely from the first mentioned shaft, an operating stem extending from the valve through the hollow shaft, means to operate the stem and valve including an elastic connection yieldable proportionately to pressure in the cylinder and means connected with the interior of the hollow shaft to supply liquid to the rotor, and a manual operative means for the valve stem.

14. A clutch device of the character described comprising a gear pump device having a driving member connected to one gear and a driven member connected to the other gear, means to control the discharge from the pump comprising a discharge port and a valve, a slidable valve operating member connected to the valve and constructed to open the valve at one position, operating means for the valve operating member including a chamber enlarged in one direction, a piston vane fitted in the small end of the chamber and reciprocable toward and from the larger end, a resilient connection between the piston vane and the slidable valve operating member tending to hold the member at open valve position, a pressure pump fluid supply operatively connected to the said driving member, a duct extending from the discharge of the pump and opening into the small end of the chamber between such end and the piston vane, and a vent for the chamber at its larger end.

15. The structure of claim 14, in which said gear pump device includes a chambered rotor having the discharge port of the first named pump opening thereinto, the said valve being slidable in the chamber of the rotor and constructed and arranged to cover the port at one position and uncover the port at another position, said vane being slidably mounted on the valve operating member, and said tapered chamber being concentric with the valve operating member.

16. The structure of claim 14, in which said resilient connection is adjustable for tension to vary its stress at open valve position on the valve operating member.

17. The structure of claim 14, in which a by-pass duct is formed between the small and large ends of the chamber, means to regulate the clearance in the by-pass duct, and a variable tension spring pressed outlet valve device closing said vent and yieldable to pressures in the chamber.

18. A variable transmission comprising a rotor body having a fluid chamber, rotatable aligned shafts secured to the rotor body, one of said shafts being designed for connection with a power source, a pair of opposing sun gears having the rotor therebetween and supported for rotation about the axes of the shafts, planet gears supported for rotation on the rotor body between and coupling said sun gears, partition means on the rotor body between the planet gears and between the sun gears, fluid inlet and exhaust ducts through the rotor body from said chamber to spaces at opposite sides of the joined portions of the sun and planet gears, shiftable valve means controlling the flow of fluid through the exhaust ducts, means for taking off power from one of the sun gears, means for shifting the valve, and a fluid tight housing encasing the gears.

19. A variable transmission as stated in claim 18, with a counter shaft adjacent to and paralleling said aligned shafts, a gear freely rotatable on the counter shaft and having driving connection with the other one of the sun gears, a hollow shaft enclosing and rotatable on the counter shaft, a driving connection between the power take-off means and the hollow shaft, a plurality of pinion gears positioned around and supported on the counter shaft for rotation on axes parallel with the counter shaft, and gear coupling means between the pinions and hollow shaft and between the pinions and said freely rotatable gear.

20. A variable transmission of the character stated in claim 18, with a counter shaft adjacent to and paralleling said aligned shafts, a gear freely rotatable on the counter shaft and having driving connection with the other one of the sun gears, a hollow shaft enclosing and rotatable on the counter shaft, a gear carried by the hollow shaft and having driving connection with said power take-off means, a plurality of gear pinions disposed around and supported on the counter shaft for rotation on axes parallel therewith, an internal gear carried by the hollow shaft and encircling and meshing with said pinions, and a gear integral and concentric with said freely rotatable gear and in mesh with the pinion gears.

21. A variable transmission of the character stated in claim 18, in which said means for shifting the valve includes a stem connected with the valve and passing from the fluid chamber axially through the other one of the shafts, resilient means engaging the stem and urging the valve in a direction to open said exhaust ducts, a fluid pump having direct drive coupling with the said other one of said shafts, and means for imposing pressure of fluid delivered from said pump against said stem in opposition to the resistant force of said resilient means.

22. A variable transmission as stated in claim 18, in which the means for shifting the valve includes a stem connected with the valve and passing from the fluid chamber axially through the other one of the shafts, a gear pump having one gear secured to the said other one of the shafts for rotation with the aligned shafts and the rotor body, a tapered chamber having the valve stem passing longitudinally therethrough, a piston vane mounted on the stem in the smaller end of the tapered chamber for movement longitudinally of the stem toward the larger end of the tapered chamber, resilient means connected between the stem and vane and opposing movement of the vane toward the larger end of the tapered chamber, means for delivering fluid from the gear pump into the smaller end of the tapered chamber behind the vane, and fluid escape means at the larger end of the tapered chamber.

23. A variable transmission as stated in claim 18, in which the means for shifting the valve includes a stem connected with the valve and passing from the fluid chamber axially through the other one of the shafts, a gear pump having one gear secured to the said other one of the shafts for rotation with the aligned shafts and the rotor body, a tapered chamber having the valve stem passing longitudinally therethrough, a piston vane mounted on the stem in the smaller end of the tapered chamber for movement longitudinally of the stem toward the larger end of the tapered chamber, resilient means connected between the stem and vane and opposing movement of the vane toward the larger end of the tapered chamber, means for delivering fluid from the gear pump into the smaller end of the tapered chamber behind the vane, fluid escape means at the larger end of the tapered chamber, and means for changing the resisting tension of the resilient means to movement of the vane by the fluid pressure.

References Cited in the file of this patent

UNITED STATES PATENTS 1,834,626    Lilly     Dec. 1, 1931

FOREIGN PATENTS 576,635    France     Aug. 23, 1924